US007984433B2

(12) United States Patent
Doi et al.

(10) Patent No.: US 7,984,433 B2
(45) Date of Patent: Jul. 19, 2011

(54) PROGRAM DISTRIBUTION METHOD AND COMPUTER SYSTEM

(75) Inventors: Koji Doi, Yokohama (JP); Akira Ioku, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1056 days.

(21) Appl. No.: 11/769,115

(22) Filed: Jun. 27, 2007

(65) Prior Publication Data

US 2008/0016512 A1 Jan. 17, 2008

(30) Foreign Application Priority Data

Jun. 29, 2006 (JP) ................................. 2006-179530

(51) Int. Cl.
 G06F 9/44 (2006.01)
 G06F 9/45 (2006.01)
(52) U.S. Cl. ..................... 717/168; 717/174; 709/203
(58) Field of Classification Search .......... 717/168–174; 709/203–204
 See application file for complete search history.

(56) References Cited

U.S. PATENT DOCUMENTS

| | | | | |
|---|---|---|---|---|
| 5,528,490 A * | 6/1996 | Hill | ............................ | 717/168 |
| 5,859,977 A * | 1/1999 | Nishiyama et al. | ........... | 709/223 |
| 5,960,189 A * | 9/1999 | Stupek et al. | ................. | 717/169 |
| 6,453,468 B1 * | 9/2002 | D'Souza | ...................... | 717/168 |
| 6,629,315 B1 * | 9/2003 | Naylor | .......................... | 717/168 |
| 6,698,018 B1 * | 2/2004 | Zimniewicz et al. | ........ | 717/175 |
| 6,704,933 B1 * | 3/2004 | Tanaka et al. | ................. | 725/132 |
| 6,807,575 B1 * | 10/2004 | Emaru et al. | .................. | 709/224 |
| 7,343,401 B2 * | 3/2008 | Tachibana et al. | ............ | 709/220 |
| 7,559,058 B2 * | 7/2009 | Blumfield et al. | ............ | 717/172 |
| 7,600,224 B2 * | 10/2009 | Obayashi et al. | ............. | 717/168 |
| 7,600,228 B2 * | 10/2009 | Takekawa et al. | ............ | 717/178 |
| 7,627,867 B2 * | 12/2009 | Banks | ......................... | 717/170 |
| 7,734,684 B2 * | 6/2010 | Zeng et al. | ..................... | 709/203 |
| 7,784,045 B2 * | 8/2010 | Bowers | ......................... | 717/168 |
| 7,797,693 B1 * | 9/2010 | Gustafson et al. | ............ | 717/168 |
| 7,814,478 B2 * | 10/2010 | Friedman | ....................... | 717/173 |
| 7,865,888 B1 * | 1/2011 | Qureshi et al. | ................ | 717/168 |
| 7,870,550 B1 * | 1/2011 | Qureshi et al. | ................ | 717/174 |

FOREIGN PATENT DOCUMENTS

| | | |
|---|---|---|
| JP | 2002-049485 | 2/2002 |
| JP | 2006-031203 | 2/2006 |

OTHER PUBLICATIONS

Naedele et al, "Trust and tamper proof software delivery", ACM SESS, pp. 51-57, 2006.*
Magnusson et al, "Fine grained revision control for collaborative software development", ACM SIGSOFT, pp. 33-41, 1993.*

(Continued)

*Primary Examiner* — Anil Khatri
(74) *Attorney, Agent, or Firm* — Antonelli, Terry, Stout & Kraus, LLP.

(57) ABSTRACT

Program distribution arrangements (e.g., carried out by a managing computer) for distributing a corresponding program to an apparatus including a processor, a memory, and a communication interface, such arrangements including: storing program request information indicating a condition required for executing the program; judging whether an apparatus as a distribution destination of the program includes a program execution control unit for controlling execution of the program; partially revising the program to a partially revised program to be distributed, according to the program request information, when the program is to be distributed to an apparatus not including the program execution control unit; and distributing the partially revised program to the apparatus not including the program execution control unit.

12 Claims, 11 Drawing Sheets

OTHER PUBLICATIONS

Neamtiu et al, "Contextual effects for version consistent dynamic software updating and safe concurrent programmiing", ACM POPL, pp. 37-49, 2007.*

Yu et al, "Evaluating the post delivery fault reporting and correction process in closed source and open source software", IEEE WoSQ, pp. 1-6, 2007.*

* cited by examiner

141 APPARATUS MANAGING INFORMATION

143 PROGRAM REQUEST INFORMATION

FIG. 4A

```
// Return whether program x is being executed
boolean running (x) {
    programs = list of programs being executed from system ();
    if (programs include x)
        return true;
    else
        return false;
}
```

144A REQUEST CHECK CODE

FIG. 4B

```
// Return whether free memory amount is x or above.
boolean free_memory (x) {
    size = Acquire free memory amount from system ();
    if (size >= x)
        return true;
    else
        return false;
}
```

144B REQUEST CHECK CODE

FIG. 4C

```
// Return whether peripheral apparatus x is provided.
boolean connected (x) {
    devices = list of connected peripheral apparatuses from system ();
    if (devices include x)
        return true;
    else
        return false;
}
```

144C REQUEST CHECK CODE

FIG. 4D

```
// Return whether usable communication speed is x or above.
boolean network_speed (x) {
    speed = usable communication speed from system ();
    if (speed >= x)
        return true;
    else
        return false;
}
```

144D REQUEST CHECK CODE

FIG. 4E

```
// Return whether usable CPU performance is x or above.
boolean cpu_power (x) {
    power = Acquire usable CPU performance from system ();
    if (power >= x)
        return true;
    else
        return false;
}
```

144E REQUEST CHECK CODE

FIG. 4F

```
// Return whether apparatus ID is x.
boolean device_id (x) {
    id = apparatus ID ();
    if (id == x)
        return true;
    else
        return false;
}
```

144F REQUEST CHECK CODE

```
main(){
    Start process ();
}

Function X () {
        Content of function X ();
    }

Function Y () {
        Content of function Y ();
    }

Function Z () {
        Content of function Z ();
    }
```

142 PROGRAM A

FIG. 6

```
main() {
    if(!running(B) || !running(C) || !free_memory(16)) {
        Display of error message();
        return;
    }                                                         } 3331
    Start process();
}

Function X () {
    if(!free_memory(24) || !connected(GPS)) {
        Display of error message();
        return;                                               } 3332
    }
    Content of function X();
}

Function Y () {
    if(!network_speed(5) || !cpu_power(10)) {
        Display of error message();
        return;                                               } 3333
    }
    Content of function Y();
}

Function Z () {
    if(device_id(3)) {
        Display of error message();
        return;                                               } 3334
    }
    Content of function Z();
}
```

333 REVISED PROGRAM A

PROGRAM DISTRIBUTION METHOD AND COMPUTER SYSTEM

CROSS-REFERENCE TO RELATED APPLICATION

This application claims priority from Japanese Patent Application JP P2006-179530, filed on Jun. 29, 2006, the content of which is hereby incorporated by reference into this application.

BACKGROUND OF THE INVENTION

The present invention relates to a computer system having at least one apparatus and a managing computer and in particular to a technique for distributing a program to the apparatus.

Recently, an embedded apparatuses such as a mobile telephone and an information home electric appliance has more and more sophisticated functions. For this, like a personal computer, a program is added and updated in the embedded apparatus. Management of addition and updating of a program requires a large load on a user. More specifically, a program is added and updated for a plenty of apparatuses connected via a network to a management server provided in the system.

On the other hand, like a personal computer, an embedded apparatus simultaneously executes a plurality of programs. Here, conflict of a resource of the embedded apparatus occurs between the programs simultaneously executed. The resource of the embedded apparatus may be, for example, a memory, a CPU, or a network connection resource. As a technique for solving this problem, a resource managing function is disclosed in JP 2006-A-31203. The resource managing function adjusts an apparatus resource conflict between a plurality of programs.

Moreover, there are a plenty of types of the embedded apparatus. Furthermore, embedded apparatuses have different configurations (memory amount, presence/absence of peripheral apparatus, and the like). Accordingly, the management of a program to be updated or added to the embedded apparatus requires a large load.

In order to use a service in various apparatuses, a plenty of programs customized for respective apparatuses are required. Alternatively, one program should be set to cope with various apparatuses. In either case, the program developing cost and the managing cost are increased.

JP-A-2002-49485 discloses a system for customizing a program in accordance with an environment of an apparatus as a distribution destination when the program is distributed. In order to execute the program in the apparatus of the distribution destination, program setting items should be set to appropriate values. The setting items include a server address, a user ID, and a database specification. According to the technique of JP-A-2002-49485, an appropriate value is managed for each of the apparatuses as distribution destinations. When the program is distributed, the managed value is automatically set to a predetermined setting item. This simplifies the customization process.

On the other hand, there is a case that an error is caused only when a particular program is executed in a particular apparatus. In this case, a program provider searches for a cause and corrects the program. Furthermore, the program provider instructs the user of the apparatus where the error has occurred, not to use the specific program until correction of the program is completed.

SUMMARY OF THE INVENTION

However, the aforementioned prior art has various problems.

In order to realize the resource managing function disclosed in JP-A-2006-31203, the apparatus should have sophisticated program execution control means having a function for adjusting the conflict between programs. For this, the apparatus manufacturing cost is increased. Accordingly, it is difficult to apply the resource managing function to all the apparatuses.

Moreover, according to the technique disclosed in JP-A-2002-49485, a program can be customized only within the range of the prepared setting items. That is, in order to execute the program in various apparatuses, programs and setting items compatible with various apparatuses should be prepared in advance. Consequently, this technique does not reduce the program development cost.

Moreover, JP-A-2006-31203 and JP-A-2002-49485 do not disclose a method for limiting the use of the program when an error has occurred. A program provider should instruct an apparatus user not to use the program through a paper document. For this, it has been difficult to instruct all the users not to use the program.

It is therefore an object of the present invention to provide a managing computer for executing a program for various apparatuses.

The representative embodiment of the present invention relates to a program distribution method in a managing computer for distributing a corresponding program to at least one apparatus each including a processor, a memory, and an interface, the method comprising steps of: storing program request information indicating a condition required for executing the program; judging whether an apparatus as a distribution destination of the program includes a program execution control unit for controlling execution of the program; and revising the program to be distributed, according to the program request information when the program is to be distributed to an apparatus not including the program execution control unit.

According to the representative embodiment of the present invention, it is possible to execute a program for various apparatuses.

Other objects, features and advantages of the invention will become apparent from the following description of the embodiments of the invention taken in conjunction with the accompanying drawings.

BRIEF DESCRIPTION OF THE DRAWINGS

FIGS. 4A to 4F explain a request check code stored in the managing server according to the embodiment of the present invention.

FIG. 6 explains a revised program to be distributed by the managing server according to the embodiment of the present invention.

DESCRIPTION OF THE EMBODIMENTS

Description will now be directed to embodiments of the present invention with reference to the drawings.

Figure 1:
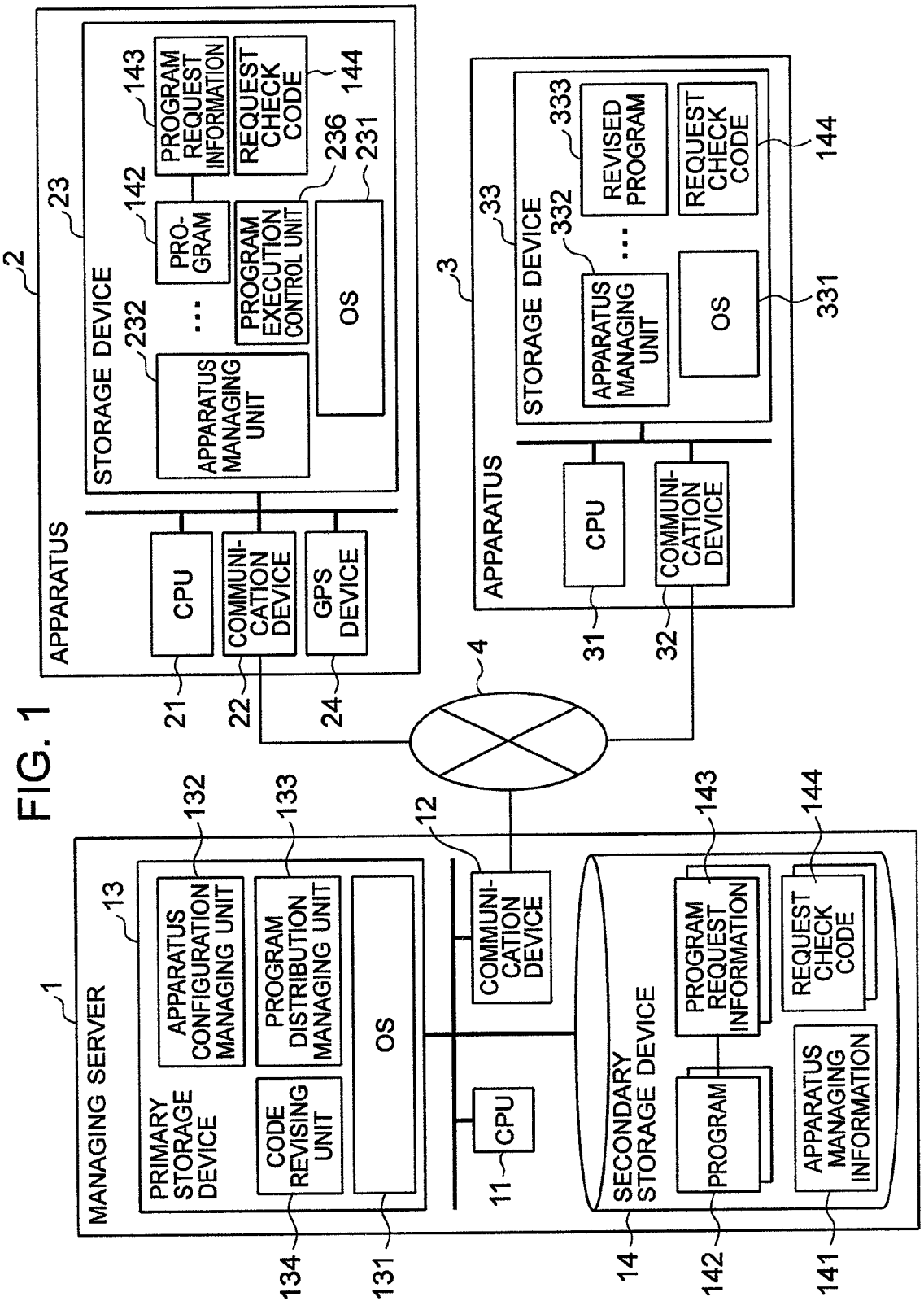
FIG. 1 is a block diagram showing a configuration of a computer system according to an embodiment of the present invention.

FIG. 1 is a block diagram showing a configuration of a computer system according to an embodiment of the present invention.

The computer system includes a managing server 1, an apparatus 2, an apparatus 3, and a network 4. Only one apparatus 2 and only one apparatus 3 are depicted but the system may includes a plurality of apparatuses 2 and a plurality of apparatuses 3.

The network 4 mutually connects the managing server 1, the apparatus 2, and the apparatus 3.

The managing server 1 is a computer for distributing a program to the apparatus 2 and the apparatus 3. More specifically, the managing server 1 includes a CPU 11, a communication device 12, a primary storage device 13, and a secondary storage device 14.

The communication device 12 is connected to an external device via the network 4. More specifically, the communication device 12 is connected to the apparatus 2 and the apparatus 3 via the network 4.

The secondary storage device 14 stores various information. More specifically, the secondary storage device 14 stores apparatus managing information 141, a program 142, program request information 143, and a request check code 144.

The apparatus managing information 141 indicates information on the configurations of the apparatus 2 and the apparatus 3 connected to the managing server 1. It should be noted that the apparatus managing information 141 will be detailed later with reference to FIG. 2.

The program 142 is distributed to the apparatus 2 and the apparatus 3 connected to the managing server 1. It should be noted that the program 142 is revised when distributed to the apparatus 3.

The program request information 143 indicates a condition required for executing the program 142. It should be noted that the program request information will be detailed later with reference to FIG. 3.

The request check code 144 is used for checking the execution condition of the program 142. It should be noted that the request check code 144 will be detailed later with reference to FIG. 4A to FIG. 4F.

The primary storage device 13 stores a program to be executed by the CPU 11 and information required by the CPU 11. More specifically, the primary storage device 13 stores an OS 131, an apparatus configuration managing unit 132, a program distribution managing unit 133, and a code revising unit 134.

The OS 131 controls the entire process of the managing server 1. The apparatus configuration managing unit 132 receives information on the configurations of the apparatus 2 and the apparatus 3 connected to the managing server 1. The apparatus configuration managing unit 132 stores the received information in the apparatus managing information 141.

The code revising unit 134 revises the program 142 by referencing the program request information 143. Thus, the code revising unit 134 generates a revised program 333.

The program distribution managing unit 133 manages distribution of the program 142 to the apparatus 2 and the apparatus 3. More specifically, the program distribution managing unit 133 distributes the program request information 143 and the request check code 144 to the apparatus 2. Moreover, the program distribution managing unit 133 distributes the revised program 333 and the request check code 144 to the apparatus 3.

The CPU 11 executes various processes by executing the program stored in the primary storage device 13. More specifically, the CPU 11 realizes the apparatus configuration managing unit 132, the program distribution managing unit 133, and the code revising unit 134 by executing the program stored in the primary storage unit 13.

The apparatus 2 includes a CPU 21, a communication device 22, a storage device 23, and a GPS (Global Positioning System) device 24. The communication device 22 is connected to the managing server 1 via the network 4.

The CPU 21 executes various processes by executing a program stored in the storage device 23. The storage device 23 stores a program to be executed by the CPU 21 and information required by the CPU 21. More specifically, the storage device 23 stores an OS 231, an apparatus managing unit 232, a program execution control unit 236, a program 142, program request information 143, and a request check code 144.

The OS 231 controls the entire process of the apparatus 2.

The apparatus managing unit 232 collects information concerning the configuration of the apparatus 2. The apparatus managing unit 232 transmits the collected information to the apparatus configuration managing unit 132 of the managing server 1. Moreover, the apparatus managing unit 232 receives the program 142, the program request information 143, and the request check code 144 from the managing server 1. The apparatus managing unit 232 stores the received program 142, the program request information 143, and the request check code 144 in the storage device 23.

The program execution control unit 236 controls execution of the program 142 by referencing the program request information 143.

The program 142, the program request information 143, and the request check code 144 have been distributed by the managing server 1. Accordingly, the program 142, the program request information 143, and the request check code 144 are the same as those stored in the secondary storage device 14 provided in the managing server 1.

The GPS device 24 acquires position information on the apparatus 2. However, the apparatus 2 may not include the GPS device 24. Moreover, the apparatus 2 may include a peripheral apparatus other than the GPS device 24. The peripheral apparatus of the apparatus 2 may be, for example, a card reader device, a display device, an input device, a CD drive, or a DVD device.

The apparatus 3 includes a CPU 31, a communication device 32, and a storage device 33. The communication device 32 is connected to the managing server 1 via the network 4.

The CPU 31 performs various processes by executing a program stored in the storage device 33. The storage device 33 stores information required by a program executed by the CPU 31 and information required by the CPU 31. More specifically, the storage device 33 stores an OS 331, an apparatus managing unit 332, a revised program 333, and the request check code 144.

The OS 331 controls the entire process of the apparatus 3.

The apparatus managing unit 332 collects information concerning the configuration of the apparatus 3. The apparatus managing unit 332 transmits the collected information to the apparatus configuration managing unit 132 of the managing server 1. Moreover, the apparatus managing unit 332 receives the revised program 333 and the request check code 144 from the managing server 1. The apparatus managing unit 332 stores the received revised program 333 and the request check code 144 in the storage device 33.

The revised program 333 is a program 142 revised by the managing server 1.

The request check code 144 has been distributed by the managing server 1. Accordingly, the request check code 144 is the same as the one stored in the secondary storage device 14 provided in the managing server 1.

It should be noted that the apparatus 3 may include a peripheral apparatus. For example, the apparatus 3 may include as the peripheral apparatus, a GPS device, a card reader device, a display device, an input device, a CD drive or a DVD drive.

The apparatus 2 and the apparatus 3 may be any apparatus having a CPU and executing a program. For example, the apparatuses 2 and 3 may be a mobile telephone, a mobile information terminal (PDA: Personal Digital Assistant), a car navigator, an HDD recorder, or a digital television.

Figure 2:
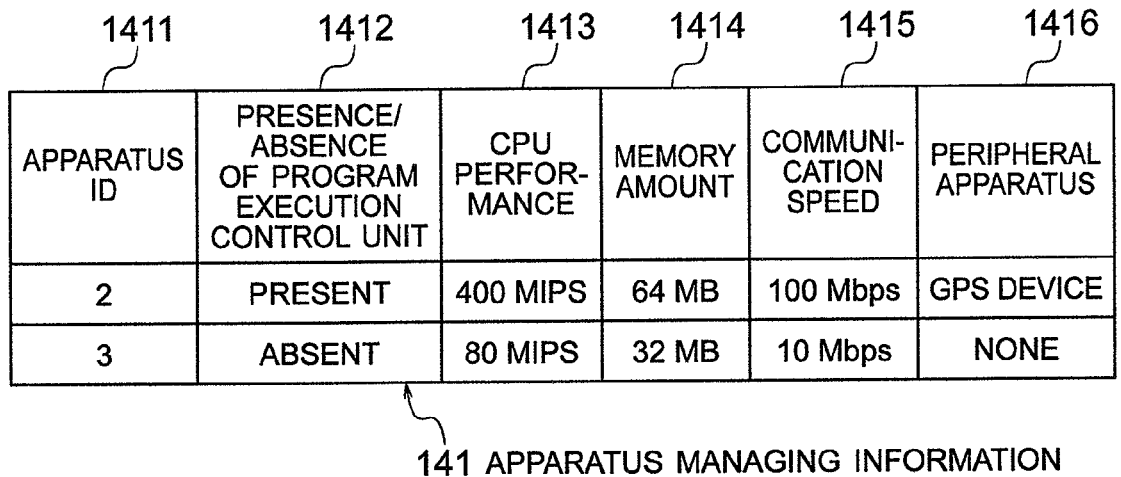
FIG. 2 shows a configuration of apparatus management information stored in a managing server according to the embodiment of the present invention.

FIG. 2 shows a configuration of the apparatus managing information 141 stored in the managing server 1 according to the embodiment of the present invention.

The apparatus managing information 141 includes an apparatus ID 1411, information 1412 indicating presence/absence of a program execution control unit, a CPU performance 1413, a memory amount 1414, a communication speed 1415, and a peripheral apparatus 1416.

The apparatus ID 1411 is a unique identifier of the apparatus 2 or 3 connected to the managing server 1. The information 1412 indicating presence/absence of a program execution control unit indicates whether the apparatus 2 or 3 identified by the apparatus ID 1411 of the record includes a program execution control unit 236.

The CPU performance 1413 indicates a performance amount of the CPU 21 or 31 provided in the apparatus 2 or 3 identified by the apparatus ID 1411 of the record. The memory amount 1414 indicates a storage capacity of the storage device 23 or 33 provided in the apparatus 2 or 3 identified by the apparatus ID 1411 of the record. The communication speed indicates a data transfer amount per unit time, of the communication device 22 or 32 provided in the apparatus 2 or 3 identified by the apparatus ID 1411 of the record.

The peripheral apparatus 1416 indicates the type of the peripheral apparatus provided in the apparatus 2 or 3 identified by the apparatus ID 1411 of the record. It should be noted that when the apparatus 2 or 3 has no peripheral apparatus, "none" is stored in the peripheral apparatus 1416.

Next, explanation will be given on the process for generating the apparatus managing information 141.

The managing server 1 acquires information on the configurations of the apparatuses 2 and 3 connected to the managing server 1. The information on the configurations of the apparatuses 2 and 3 include information indicating presence/absence of the program execution control unit 236, a performance amount of the CPU 21 or 31, a storage capacity of the storage device 23 or 33, a data transfer amount of the communication device 22 or 32 per unit time, and a type of the peripheral apparatus provided in the apparatus 2 or 3.

Next, the managing server 1 generates the apparatus managing information 141 based on the acquired information on the configurations of the apparatuses 2 and 3.

More specifically, the managing server 1 stores an identifier of the apparatus 2 or 3 from which the information on the configuration has been acquired, into the apparatus ID 1411 of the apparatus managing information 141. Next, the managing server 1 stores the acquired information indicating presence/absence of the program execution control unit 236 in the information 1412 indicating presence/absence of the program execution control unit of the apparatus managing information 141. Next, the managing server 1 stores the acquired performance amount of the CPU 21 or 31 in the CPU performance 1413 of the apparatus managing information 141.

Next, the managing server 1 stores the acquired storage capacity of the storage device 23 or 33 in the memory amount 1414 of the apparatus managing information 141. Next, the managing server 1 stores the acquired data transfer amount per unit, of the communication device 22 or 32 in the communication speed 1415 of the apparatus managing information 141. Next, the managing server 1 stores the acquired type of the peripheral apparatus in the peripheral apparatus 1416 of the apparatus managing information 141.

Figure 3:
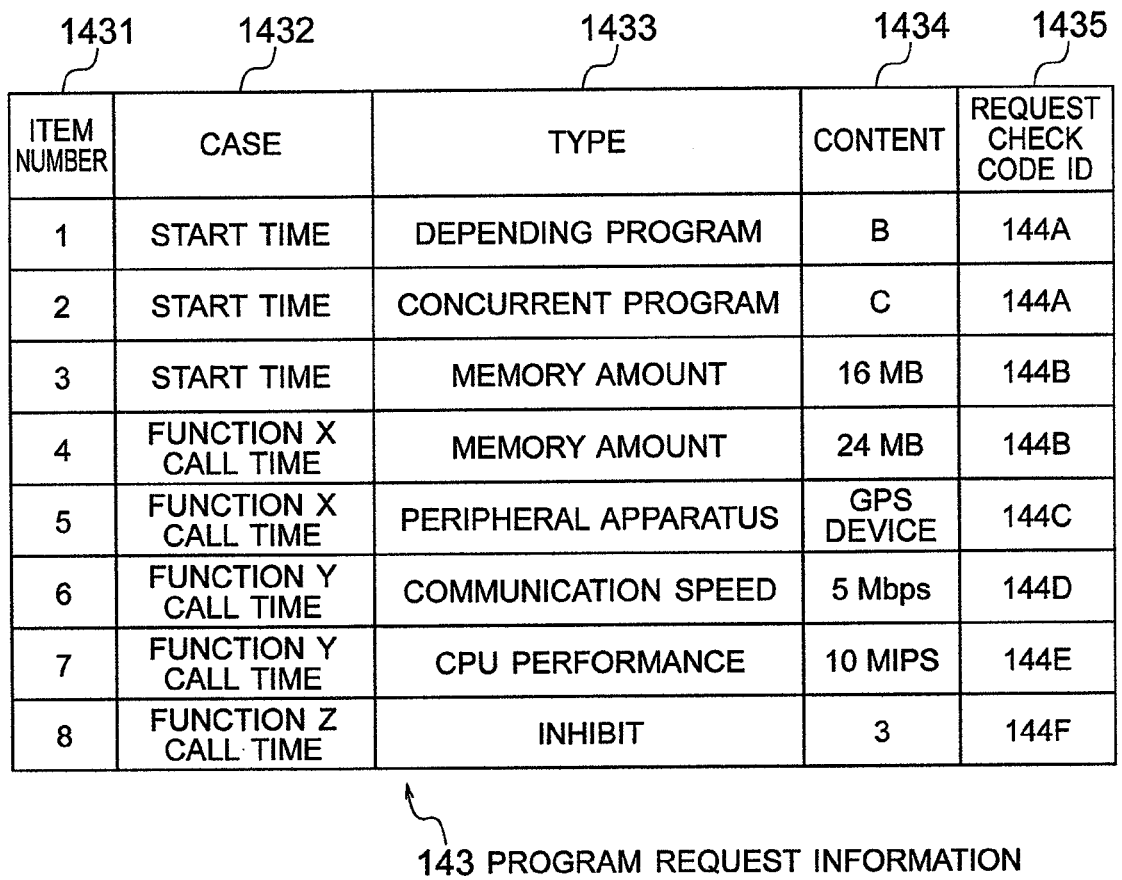
FIG. 3 shows a configuration of program requesting information stored in the managing server according to the embodiment of the present invention.

FIG. 3 shows a configuration of the program request information 143 stored in the managing server 1 according to the embodiment of the present invention.

The program request information 143 exists for each program 142. For this, the managing server 1 stores the number of program information pieces 143 identical with the number of programs 142. This explanatory table shows the program request information 143 corresponding to a program A 142.

The program request information 143 stores an item number 1431, a case 1432, a type 1433, a content 1434, and a request check code ID 1435.

The item number 1431 is a unique identifier of the record contained in the program request information 143. The case 1432 indicates the moment corresponding to the record. The type 1433 indicates the type of condition required by the apparatus 2 or 3 executing the program 142.

The content 1434 is a condition value required by the apparatus 2 or 3 executing the program 142. It should be noted that the content 1434 is substituted into a variable x of the request check code 144 identified by the request check code ID 1435 of the record.

The request check code ID 1435 is a unique identifier of the request check code executed by the apparatus 2 or 3 at the moment corresponding to the case 1432 of the record.

According to the record identified by "1" of the item number 1431, the apparatus 2 or 3 should be executing a program B 142 upon start of the program A 142. Moreover, according to the record identified by "2" of the item number 1431, the apparatus 2 or 3 should be executing a program C 142 upon start of the program A 142

Moreover, according to the record identified by "3" of the item number 1431, a free memory amount of "16 MB" or above is required upon start of the program A 142. The free memory amount is a storage capacity which can be used for executing the program 142 in the storage capacity of the storage device 23 or 33 provided in the apparatus 2 or 3. That is, the free memory amount is equal to the storage capacity of the storage device 23 or 33 provided in the apparatus 2 or 3 which is subtracted by a storage capacity which is currently used and a storage capacity allocated for a work.

Moreover, according to the record identified by "4" of the item number 1431, a free memory amount of "24 MB" or above is required upon call of a function X. Moreover, according to the record identified by "5" of the item number 1431, the apparatus 2 or 3 should include the GPS device 24 when calling the function X.

Moreover, according to the record identified by "6" of the item number 1431, a usable communication speed of "5 Mbps" or above is required upon call of a function Y. The usable communication speed is a data transfer amount which can be used for executing the program 142 in the data transfer amount per unit time, of the communication device 22 or 32 provided in the apparatus 2 or 3. That is, the usable communication speed is a value equal to a maximum value of the communication speed of the communication device 22 or 32 subtracted by the communication speed being used by the currently executed program.

Moreover, according to the record identified by "7" of the item number 1431, a usable CPU performance of "10 MIPS" or above is required upon call of the function Y. The usable CPU performance is a performance amount which can be used for executing the program 142 in the performance amount of the CPU 21 or 31 provided in the apparatus 2 or 3. That is, the usable CPU performance is a value equal to a maximum value of the performance amount of the CPU 21 or 31 subtracted by the performance amount being used by the currently executed program.

Moreover, according to the record identified by "8" of the item number 1431, the apparatus 3 identified by "3" of the function ID is disabled to call a function Z.

FIG. 4A explains a request check code 144A stored in the managing server 1 according to the embodiment of the present invention.

The request check code 144A in FIG. 4A is identified by "144A" of the request check code ID. The request check code 144A judges whether the apparatus 2 or 3 is executing the program x142. If the apparatus 2 or 3 is executing the program x142, the request check code 144A returns "true". On the other hand, if the apparatus 2 or 3 is not executing the program x142, the request check code 144A returns "false".

FIG. 4B explains a request check code 144B stored in the managing server 1 according to the embodiment of the present invention.

The request check code 144B in FIG. 4B is identified by "144B" of the request check code ID. The request check code 144B judges whether the apparatus 2 or 3 has a free memory of "x" or above. If the free memory is "x" or above, the request check code 144B returns "true". On the other hand, if the free memory is smaller than "x", the request check code 144B returns "false".

FIG. 4C explains a request check code 144C stored in the managing server 1 according to the embodiment of the present invention.

The request check code 144C in FIG. 4C is identified by "144C" of the request check code ID. The request check code 144C judges whether the apparatus 2 or 3 includes a peripheral apparatus x. If the apparatus 2 or 3 includes a peripheral apparatus, the request check code 144C returns "true". On the other hand, if the apparatus 2 or 3 includes no peripheral apparatus, the request check code 144C returns "false".

FIG. 4D explains a request check code 144D stored in the managing server 1 according to the embodiment of the present invention.

The request check code 144D in FIG. 4D is identified by "144D" of the request check code ID. The request check code 144D judges whether the apparatus 2 or 3 has a usable communication speed of "x" or above. If the usable communication speed is "x" or above, the request check code 144D returns "true". On the other hand, if the usable communication speed is smaller than "x", the request check code 144D returns "false".

FIG. 4E explains a request check code 144E stored in the managing server 1 according to the embodiment of the present invention.

The request check code 144E in FIG. 4E is identified by the request check code 144E. The request check code 144E judges whether the apparatus 2 or 3 has a usable CPU performance of "x" or above. If the usable CPU performance is "x" or above, the request check code 144E returns "true". On the other hand, if the usable CPU performance is smaller than "x", the request check code 144E returns "false".

FIG. 4F explains a request check code 144F stored in the managing server 1 according to the embodiment of the present invention.

The request check code 144F in FIG. 4F is identified by "144F" of the request check code ID. The request check code 144F judges whether the apparatus 2 or 3 has a device ID "x". If the device ID is "x", the request check code 144F returns "true". On the other hand, if the device ID is not "x", the request check code 144F returns "false".

Figure 5:
FIG. 5 explains a program to be distributed by the managing server according to the embodiment of the present invention.

FIG. 5 explains the program A 142 distributed by the managing server 1 according to the embodiment of the present invention.

The program A 142 includes a start process, the process of function X, the process of function Y, and the process of function Z.

FIG. 6 explains the revised program A 333 distributed by the managing server 1 according to the embodiment of the present invention.

The revised program A 333 is a program obtained by revising the program A 142 by the managing server 1. Accordingly, the revised program A 333 includes a start process, the process of function X, the process of function Y, and the process of function Z like the program A 142.

Moreover, the revised program A 333 includes positions 331 to 3334.

A code is inserted to each of the positions 3331 to 3334 according to the program request information 143 corresponding to the program A 142. It should be noted that the code insertion will be detailed later with reference to FIG. 9.

The position 3331 corresponds to a record to store "start time" in 1432 in case of the program request information 143. For this, the position 3331 is a head of the main which is a function firstly called upon start of the program 142. If at least one of the conditions: "the return value of running (B) is false", "the return value of running (C) is true", and "the return value of free_memory (16) is false" is satisfied, the code inserted into the position 3331 displays an error message and the program A 142 is terminated.

The position 3332 corresponds to a record to store "function X call time" in 1432 in case of the program request information 143. For this, the position 3332 is a head of a function performing the process of function X. If at least one of the conditions: "the return value of free_memory (24) is false" and "the return value of connected (GPS) is false" is satisfied, the code inserted into the position 3332 displays an error message and the process of function X is terminated.

The position 3333 corresponds to a record to store "function Y call time" in 1432 in case of the program request information 143. For this, the position 3333 is a head of a function performing the process of function Y. If at least one of the conditions: "the return value of network_speed (5) is false" and "the return value of cpu_power (10) is false" is satisfied, the code inserted into the position 3333 displays an error message and the process of function Y is terminated.

The position 3334 corresponds to a record to store "function Z call time" in 1432 in case of the program request information 143. For this, the position 3334 is a head of a function performing the process of function Z. If the condition "the return value of device_id (3) is true" is satisfied, the code inserted into the position 3334 displays an error message and the process of function Z is terminated.

Hereinafter, explanation will be given on the process performed by the computer system according to the embodiment of the present invention.

Figure 7:
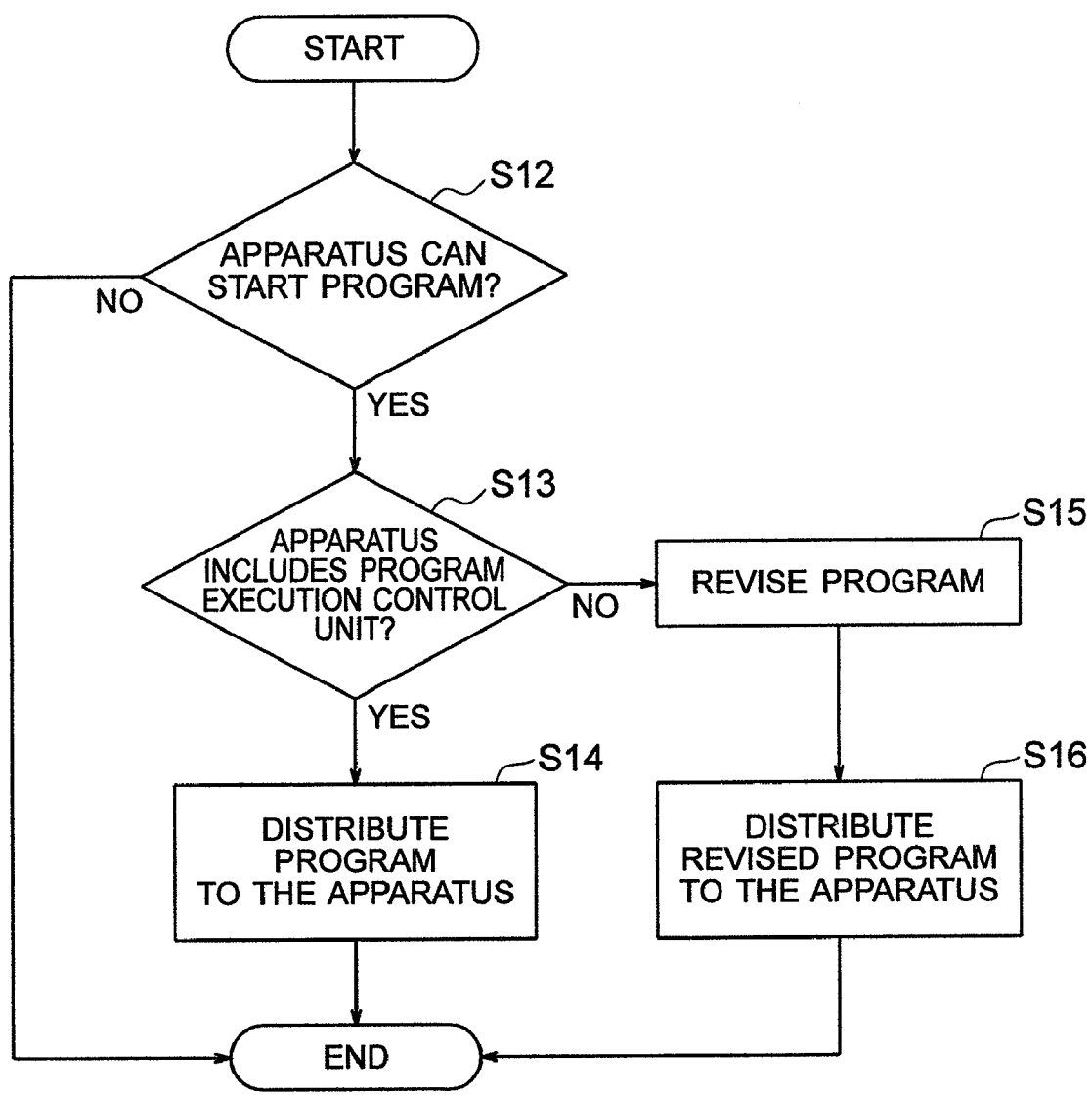
FIG. 7 is a flowchart of a program distribution process to be executed by the managing server according to the embodiment of the present invention.

FIG. 7 is a flowchart of a program distribution process executed by the managing server 1 of the embodiment of the present invention.

Here, explanation will be given on the case when the managing server 1 distributes the program A 142 to the apparatus 2 or 3.

Firstly, the managing server 1 judges whether the apparatus 2 or 3 as the distribution destination can start (can execute) the program A 142 (S12).

More specifically, the managing server 1 selects all the records containing "start time" in 1432 in the case of the program request information 143 from the program request information 143 corresponding to the program A 142. Here, the managing server 1 selects a record identified by "1" of the item number 1431, a record identified by "2" of the item number 1431, and a record identified by "3" of the item number 1431.

Next, the managing server 1 extracts the type 1433, the content 1434, and the request check code ID 1435 from the selected records. Next, the managing server 1 judges whether the apparatus 2 or 3 as the distribution destination can start the program A 142 according to the extracted type 1433, the content 1434, and the request check code ID 1435.

For example, the managing server judges whether the apparatus 2 or 3 as the distribution destination is executing the program B 142. If the apparatus 2 or 3 as the distribution destination is not executing the program B 142, the managing server 1 judges that the apparatus 2 or 3 as the distribution destination cannot start the program A 142.

On the other hand, if the apparatus 2 or 3 as the distribution destination is executing the program B 142, the managing server 1 judges whether the apparatus 2 or 3 as the distribution destination is executing the program C 142. If the apparatus 2 or 3 as the distribution destination is executing the program C 142, the managing server 1 judges that the apparatus 2 or 3 as the distribution destination cannot start the program A 142.

On the other hand, if the apparatus 2 or 3 as the distribution destination is executing the program B 142, the managing server 1 judges whether the apparatus 2 or 3 as the distribution destination has a free memory amount of "16 MB" or above. If the apparatus 2 or 3 as the distribution destination has a free memory amount smaller than "16 MB", the managing server 1 judges that the apparatus 2 or 3 as the distribution destination cannot start the program A 142. On the other hand, if the apparatus 2 or 3 as the distribution destination has a free memory amount of "16 MB" or above, the managing server 1 judges that the apparatus 2 or 3 as the distribution destination can start the program A 142.

If the apparatus 2 or 3 as the distribution destination cannot start the program A 142, the managing server 1 terminates the program distribution process.

On the other hand, if the apparatus 2 or 3 as the distribution destination can start the program A 142, the managing server 1 judges whether the apparatus 2 or 3 as the distribution destination includes the execution control unit 236.

More specifically, the managing server 1 selects a record in which the identifier of the apparatus 2 or 3 as the distribution destination coincides with the apparatus ID 1411 of the apparatus managing information 141 from the apparatus managing information 141. Next, the managing server 1 extracts information 1412 indicating presence/absence of the program execution control unit from the selected record.

If "present" is stored in the extracted information 1412 indicating presence/absence of the program execution control unit, the managing server 1 judges that the apparatus 2 or 3 as the distribution destination includes the program execution control unit 236. On the other hand, if "absent" is stored in the extracted information 1412 indicating presence/absence of the program execution control unit, the managing server 1 judges that the apparatus 2 or 3 as the distribution destination does not include the program execution control unit 236.

It should be noted that in the present embodiment, the apparatus 2 includes the program execution control unit 236. On the other hand, the apparatus 3 does not include the program execution control unit 236.

If the apparatus 2 as the distribution destination includes the program execution control unit 236 (when the distribution destination is the apparatus 2), the managing server 1 distributes the program A 142 and the program request information 143 corresponding to the program A 142 to the apparatus 2 (S14).

Here, the managing server 1 may also distribute the request check code 144 corresponding to the program A 142. More specifically, the managing server 1 extracts the request check code ID 1435 from all the records of the program request information 143 corresponding to the program A 142. Next, the managing server 1 also distributes the request check code 144 identified by the extracted request check code ID 1435.

Then, the managing server 1 terminates the program distribution process.

On the other hand, if the apparatus 3 as the distribution destination does not include the program execution control unit 236 (when the distribution destination is the apparatus 3), the managing server 1 revises the program A 142 to create a revised program A 333 (s15). The process for revising the program A 142 will be detailed later with reference to FIG. 9.

Next, the managing server 1 distributes the created revised program A 333 and the request check code 144 corresponding to the program A 142 to the apparatus 3. Then, the managing server 1 terminates the program distribution process.

Figure 8:
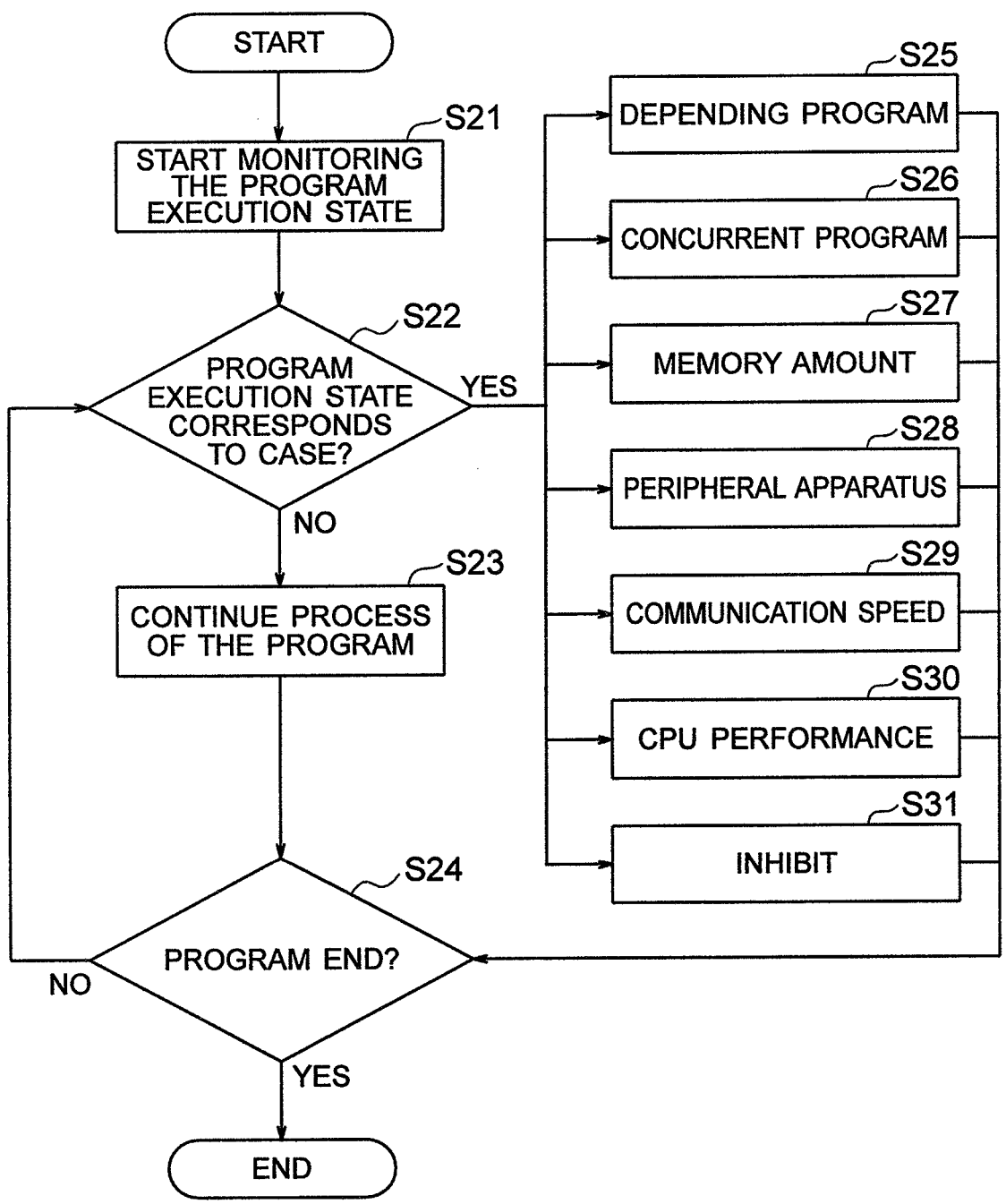
FIG. 8 is a flowchart of a program execution process to be executed by an apparatus according to the embodiment of the present invention.

FIG. 8 is a flowchart of the program execution process executed by the apparatus 2 of the embodiment of the present invention.

Here, explanation will be given on the case when the apparatus 2 executes the program A 142.

Upon reception of an execution request of the program A 142 from a user, the OS 231 of the apparatus 2 starts execution of the program.

Firstly, the OS 231 starts the program A 142 and supplies the information corresponding to the program A 142 to the program execution control unit 236. It should be noted that the information corresponding to the program A 142 contains the program request information 143 and the request check code 144.

Then, the program execution control unit 236 starts monitoring an execution state of the program A 142 (S21). Next, the program execution control unit 236 judges whether the execution state of the program A 142 corresponds to any of the case 1432 in the program request information 143 (S22).

If the execution state of the program A 142 does not correspond to any of the case 1432, the program execution control unit 236 continues the process of the program A 142 as it is (S23). Next, the program execution control unit 236 judges whether the process of the program A 142 is terminated (S24).

If the process of the program A 142 is not terminated, the program execution control unit 236 returns to step S22 and repeats the program execution process.

On the other hand, if the process of the program A 142 is terminated, the program execution control unit 236 terminates the program execution process.

On the other hand, if the execution state of the program A 142 corresponds to any of the case 1432, the program execution control unit 236 selects all the records in which the execution state of the program A 142 coincides with the case 1432 in the program request information 143, from the program request information 143.

For example, if the execution state of the program A 142 is a start time, the program execution control unit 236 selects a record identified by "1" of the item number, a record identified by "2" of the item number, and a record identified by "3" of the item number from the program request information 143.

Next, the program execution control unit 236 extracts the type 1433, the content 1434, and the request check code ID 1435 from the selected records.

Next, the program execution control unit 236 judges whether the extracted type 1433 is a dependent program, a concurrent program, a memory amount, a peripheral apparatus, a communication speed, a CPU speed, or inhibit.

If the extracted type 1433 is a dependent program (S25), the program execution control unit 236 judges whether the program B 142 corresponding to the extracted content 1434 is being executed.

More specifically, the program execution control unit 236 starts the request check code 144A identified by the extracted request check code ID 1435. Then, the request check code 144A substitutes "B" of the content 1434 extracted by the program execution control unit 236 into a variable x. Moreover, the request check code 144A judges whether the apparatus 2 is executing the program B 142. If the apparatus 2 is executing the program B 142, the request check code 144A returns "true" to the program execution control unit 236. On the other hand, if the apparatus 2 is not executing the program B 142, the request check code 144A returns "false" to the program execution control unit 236.

If "true" is received, the program execution control unit 236 judges that the program B 142 corresponding to the extracted content 1434 is being executed. Accordingly, the program execution control unit 236 continues the process of the program A 142 as it is. And the program execution control unit 236 advances to step S24.

On the other hand, if "false" is received, the program execution control unit 236 judges that the program B 142 corresponding to the extracted content 1434 is not being executed. Accordingly, the program execution control unit 236 interrupts the process of the program A 142. And the program execution control unit 236 advances to step S24.

On the other hand, if the extracted type 1433 is a concurrent program (S26), the program execution control unit 236 judges whether the program C142 corresponding to the extracted content 1434 is being executed.

More specifically, the program execution control unit 236 starts the request check code 144A identified by the extracted request check code ID 1435. Then, the request check code 144A substitutes "C" of the content 1434 extracted by the program execution control unit 236 into a variable x. Moreover, the request check code 144A judges whether the apparatus 2 is executing the program C 142. If the apparatus 2 is executing the program C 142, the request check code 144A returns "true" to the program execution control unit 236. On the other hand, if the apparatus 2 is not executing the program C 142, the request check code 144A returns "false" to the program execution control unit 236.

If "false" is received, the program execution control unit 236 judges that the program C 142 corresponding to the extracted content 1434 is not being executed. Accordingly, the program execution control unit 236 continues the process of the program A 142 as it is. And the program execution control unit 236 advances to step S24.

On the other hand, if "true" is received, the program execution control unit 236 judges that the program C 142 corresponding to the extracted content 1434 is being executed. Accordingly, the program execution control unit 236 interrupts the process of the program A 142. And the program execution control unit 236 advances to step S24.

On the other hand, if the extracted type 1433 is a memory amount (S27), the program execution control unit 236 judges whether the apparatus 2 has a free memory of "16 MB" or above in the extracted content 1434.

More specifically, the program execution control unit 236 starts the request check code 144B identified by the extracted request check code ID 1435. Then, the request check code 144B substitutes "16 MB" of the content 1434 extracted by the program execution control unit 236 into a variable x. Moreover, the request check code 144B judges whether the apparatus 2 has a free memory of "16 MB" or above. If the free memory is "16 MB" or above, the request check code 144B returns "true" to the program execution control unit 236. On the other hand, if the free memory is smaller than "16 MB", the request check code 144B returns "false" to the program execution control unit 236.

If "true" is received, the program execution control unit 236 judges that the apparatus 2 has a free memory of "16 MB" or above. Accordingly, the program execution control unit 236 continues the process of the program A 142 as it is. And the program execution control unit 236 advances to step S24.

On the other hand, if "false" is received, the program execution control unit 236 judges that the apparatus 2 does not have a free memory of "16 MB" or above. Accordingly, the program execution control unit 236 interrupts the process of the program A 142. And the program execution control unit 236 advances to step S24.

On the other hand, if the extracted type 1433 is a peripheral apparatus (S28), the program execution control unit 236 judges whether the apparatus 2 has the "GPS" device of the extracted content 1434.

More specifically, the program execution control unit 236 starts the request check code 144C identified by the extracted request check code ID 1435. Then, the request check code 144C substitutes "GPS device" of the content 1434 extracted by the program execution control unit 236 into a variable x. Moreover, the request check code 144C judges whether the apparatus 2 has the GPS device 24. If the apparatus 2 has the GPS device 24, the request check code 144C returns "true" to the program execution control unit 236. On the other hand, if the apparatus 2 does not has the GPS device 24, the request check code 144C returns "false" to the program execution control unit 236.

If "true" is received, the program execution control unit 236 judges that the apparatus 2 has the "GPS device of the extracted content 1434. Accordingly, the program execution control unit 236 continues the process of the program A 142 as it is. And the program execution control unit 236 advances to step S24.

On the other hand, if "false" is received, the program execution control unit 236 judges that the apparatus 2 does not have the "GPS device" of the extracted content 1434. Accordingly, the program execution control unit 236 interrupts the process of the program A 142. And the program execution control unit 236 advances to step S24.

On the other hand, if the extracted type 1433 is a communication speed (S29), the program execution control unit 236 judges whether apparatus 2 can provide a usable communication speed of "5 Mbps" or above of the extracted content 1434.

More specifically, the program execution control unit 236 starts the request check code 144D identified by the extracted request check code ID 1435. Then, the request check code 144D substitutes "5 Mbps" of the content 1434 extracted by the program execution control unit 236 into a variable x. Moreover, the request check code 144D judges whether the apparatus 2 has a usable communication speed of "5 Mbps" or above. If the usable communication speed is "5 Mbps" or above, the request check code 144D returns "true" to the program execution control unit 236. On the other hand, if the usable communication speed is smaller than "5 Mbps", the request check code 144D returns "false" to the program execution control unit 236.

If "true" is received, the program execution control unit 236 judges that the apparatus 2 can provide a usable communication speed of "5 Mbps" or above. Accordingly, the program execution control unit 236 continues the process of the program A 142 as it is. And the program execution control unit 236 advances to step S24.

On the other hand, if "false" is received, the program execution control unit 236 judges that the apparatus 2 cannot provide a usable communication speed of "5 Mbps" or above. Accordingly, the program execution control unit 236 interrupts the process of the program A 142. And the program execution control unit 236 advances to step S24.

On the other hand, if the extracted type 1433 is a CPU performance (S30), the program execution control unit 236 judges whether apparatus 2 can provide a usable CPU performance of "10 MIPS" or above of the extracted content 1434.

More specifically, the program execution control unit 236 starts the request check code 144E identified by the extracted request check code ID 1435. Then, the request check code 144E substitutes "10 MIPS" of the content 1434 extracted by the program execution control unit 236 into a variable x. Moreover, the request check code 144E judges whether the apparatus 2 has a usable CPU performance of "10 MIPS" or above. If the usable CPU performance is "10 MIPS" or above, the request check code 144E returns "true" to the program execution control unit 236. On the other hand, if the usable CPU performance is smaller than "10 MIPS", the request check code 144E returns "false" to the program execution control unit 236.

If "true" is received, the program execution control unit 236 judges that the apparatus 2 can provide a usable CPU performance of "10 MPIS" or above. Accordingly, the program execution control unit 236 continues the process of the program A 142 as it is. And the program execution control unit 236 advances to step S24.

On the other hand, if "false" is received, the program execution control unit 236 judges that the apparatus 2 cannot provide a usable CPU performance of "10 MIPS" or above. Accordingly, the program execution control unit 236 interrupts the process of the program A 142. And the program execution control unit 236 advances to step S24.

On the other hand, if the extracted type 1433 is an inhibit (S31), the program execution control unit 236 judges whether the apparatus 2 can be identified by "3" of the extracted content 1434.

More specifically, the program execution control unit 236 starts the request check code 144F identified by the extracted request check code ID 1435. Then, the request check code 144F substitutes "3" of the content 1434 extracted by the program execution control unit 236 into a variable x. Moreover, the request check code 144F judges whether the apparatus ID assigned to the apparatus 2 is "3". If the apparatus ID is "3", the request check code 144F returns "true" to the program execution control unit 236. On the other hand, if the apparatus ID is not "3", the request check code 144F returns "false" to the program execution control unit 236.

If "false" is received, the program execution control unit 236 judges that the apparatus 2 cannot be identified by "3" of the extracted content 1434. Accordingly, the program execution control unit 236 continues the process of the program A 142 as it is. And the program execution control unit 236 advances to step S24.

On the other hand, if "true" is received, the program execution control unit 236 judges that the apparatus 2 can be identified by "3" of the extracted content 1434. Accordingly, the program execution control unit 236 interrupts the process of the program A 142. And the program execution control unit 236 advances to step S24.

As has been described above, the program execution control unit 236 monitors the execution state of the program A 142 and controls the execution of the program A 142.

Figure 9:
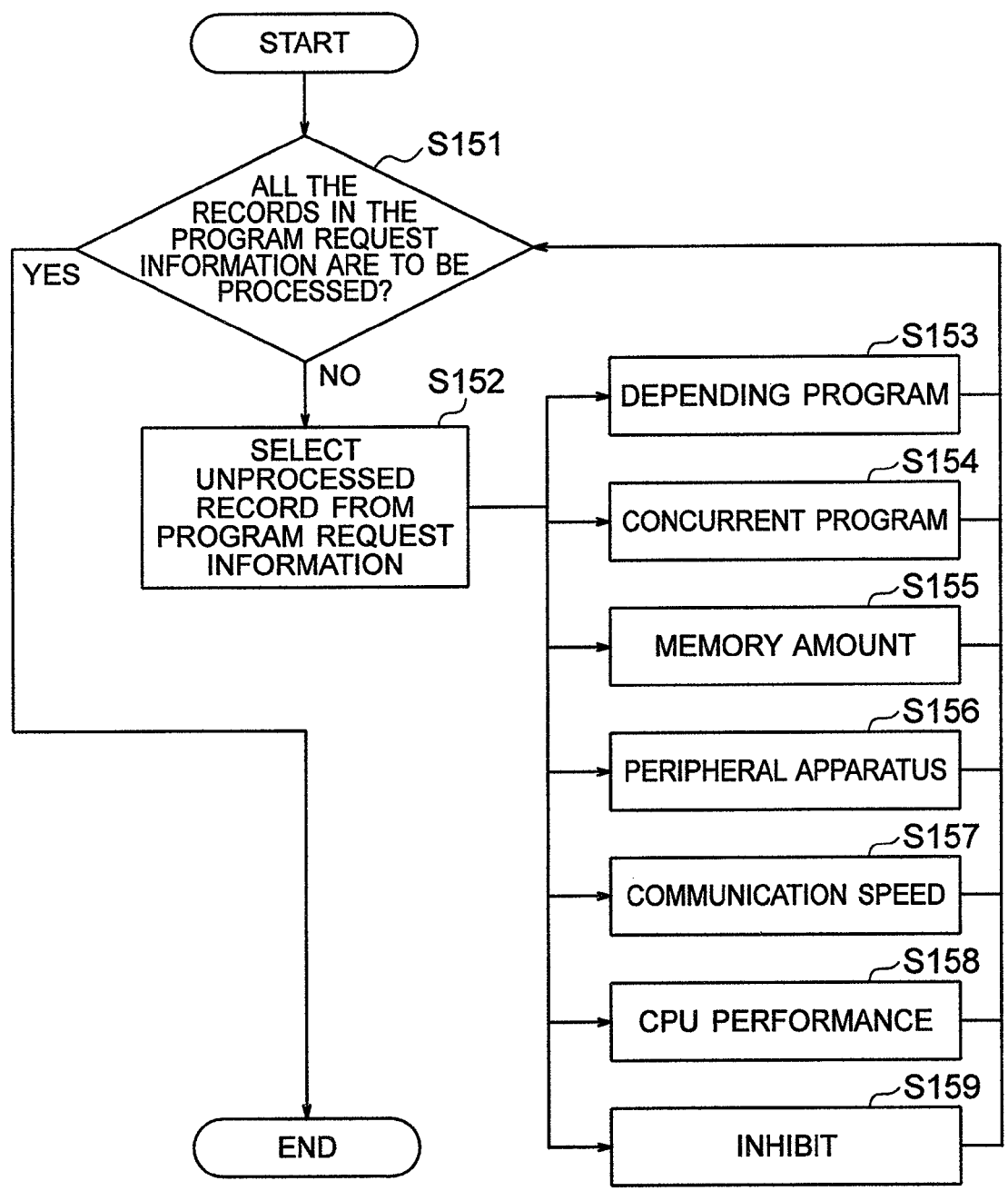
FIG. 9 is a flowchart of a program revision process to be executed by the managing server according to the embodiment of the present invention.

FIG. 9 is a flowchart of the program revision process executed by the managing server 1 of the embodiment of the present invention.

The program revision process is executed in step S15 of the program distribution process (FIG. 7).

Here, explanation will be given on a case that the managing server 1 revises the program A 142 (FIG. 5) into the revised program A 333 (FIG. 6).

Firstly, the managing server 1 judges whether all the records contained in the program request information 143 corresponding to the program 142 have been processed (S151). If all the records have been processed, the managing server 1 terminates the program revision process.

On the other hand, if not all the records have been processed, the managing server 1 selects one unprocessed record from the program request information 143 corresponding to the program 142 (S152).

Next, the managing server 1 extracts the case 1432, the type 1433, the content 1434, and the request check code ID 1435 from the selected record. Next, the managing server 1 judges whether the selected type 1433 is a depending program, a concurrent program, a memory amount, a frequency apparatus, a communication speed, a CPU performance, or inhibit.

If the extracted type 1433 is the depending program (S153), the managing server 1 identifies the position 3331 corresponding to "start time" of the extracted case 1432 from the program A 142. Next, the managing server 1 inserts a code confirming that the program B 142 corresponding to the extracted content 1434 is being executed, into the identified position 3331. Then, the managing server returns to step S151.

The inserted code executes the request check code 144A (function running) identified by the extracted request check code ID 1435. Next, the inserted code receives a result from the request check code 144A identified by the extracted request check code ID 1435. If the received result is "false", the inserted code instructs display of an error message and interruption of the process of the program A 142.

On the other hand, if the extracted type 1433 is the concurrent program (S154), the managing server 1 identifies the position 3331 corresponding to "start time" of the extracted case 1432 from the program A 142. Next, the managing server 1 inserts a code confirming that the program C 142 corresponding to the extracted content 1434 is not being executed, into the identified position 3331. Then, the managing server returns to step S151.

The inserted code executes the request check code 144A (function running) identified by the extracted request check code ID 1435. Next, the inserted code receives a result from the request check code 144A identified by the extracted request check code ID 1435. If the received result is "true", the inserted code instructs display of an error message and interruption of the process of the program A 142.

On the other hand, if the extracted type 1433 is the memory amount (S155), the managing server 1 identifies the position 3331 corresponding to "start time" of the extracted case 1432 from the program A 142. Next, the managing server 1 inserts a code confirming that the apparatus 3 has a free memory of "16 MB" or above of the extracted content 1434, into the identified position 3331. Then, the managing server 1 returns to step S151.

The inserted code executes the request check code 144B (function free_memory) identified by the extracted request check code ID 1435. Next, the inserted code receives a result from the request check code 144B identified by the extracted request check code ID 1435. If the received result is "false", the inserted code instructs display of an error message and interruption of the process of the program A 142.

On the other hand, if the extracted type 1433 is the peripheral apparatus (S156), the managing server 1 identifies the position 3332 corresponding to "function X call time" of the extracted case 1432 from the program A 142. Next, the managing server 1 inserts a code confirming that the apparatus 3 includes the "GPS device" of the extracted content 1434, into the identified position 3332. Then, the managing server 1 returns to step S151.

The inserted code executes the request check code 144C (function connected) identified by the extracted request check code ID 1435. Next, the inserted code receives a result from the request check code 144C identified by the extracted request check code ID 1435. If the received result is "false", the inserted code instructs display of an error message and interruption of the process of the program A 142.

On the other hand, if the extracted type 1433 is the communication speed (S157), the managing server 1 identifies the position 3333 corresponding to "function Y call time" of the extracted case 1432 from the program A 142. Next, the managing server 1 inserts a code confirming that the apparatus 3 can provide a usable communication speed of "5 Mbps" or above of the extracted content 1434, into the identified position 3333. Then, the managing server 1 returns to step S151.

The inserted code executes the request check code 144D (function network_speed) identified by the extracted request check code ID 1435. Next, the inserted code receives a result from the request check code 144D identified by the extracted request check code ID 1435. If the received result is "false", the inserted code instructs display of an error message and interruption of the process of the program A 142.

On the other hand, if the extracted type 1433 is the CPU performance (S158), the managing server 1 identifies the position 3333 corresponding to "function Y call time" of the extracted case 1432 from the program A 142. Next, the managing server 1 inserts a code confirming that the apparatus 3 can provide a usable CPU performance of "10 MIPS" or above of the extracted content 1434, into the identified position 3333. Then, the managing server 1 returns to step S151.

The inserted code executes the request check code 144E (function cpu_power) identified by the extracted request check code ID 1435. Next, the inserted code receives a result from the request check code 144E identified by the extracted request check code ID 1435. If the received result is "false", the inserted code instructs display of an error message and interruption of the process of the program A 142.

On the other hand, if the extracted type 1433 is the inhibit (S159), the managing server 1 identifies the position 3334 corresponding to "function Z call time" of the extracted case 1432 from the program A 142. Next, the managing server 1 inserts a code confirming that the apparatus 3 cannot be identified by "3" of the extracted content 1434, into the identified position 3334. Then, the managing server 1 returns to step S151.

The inserted code executes the request check code 144F (function device_id) identified by the extracted request check code ID 1435. Next, the inserted code receives a result from the request check code 144F identified by the extracted request check code ID 1435. If the received result is "true", the inserted code instructs display of an error message and interruption of the process of the program A 142.

As has been described above, the managing server 1 revises the program 142 into the revised program 333 according to the program request information 143.

Figure 10:
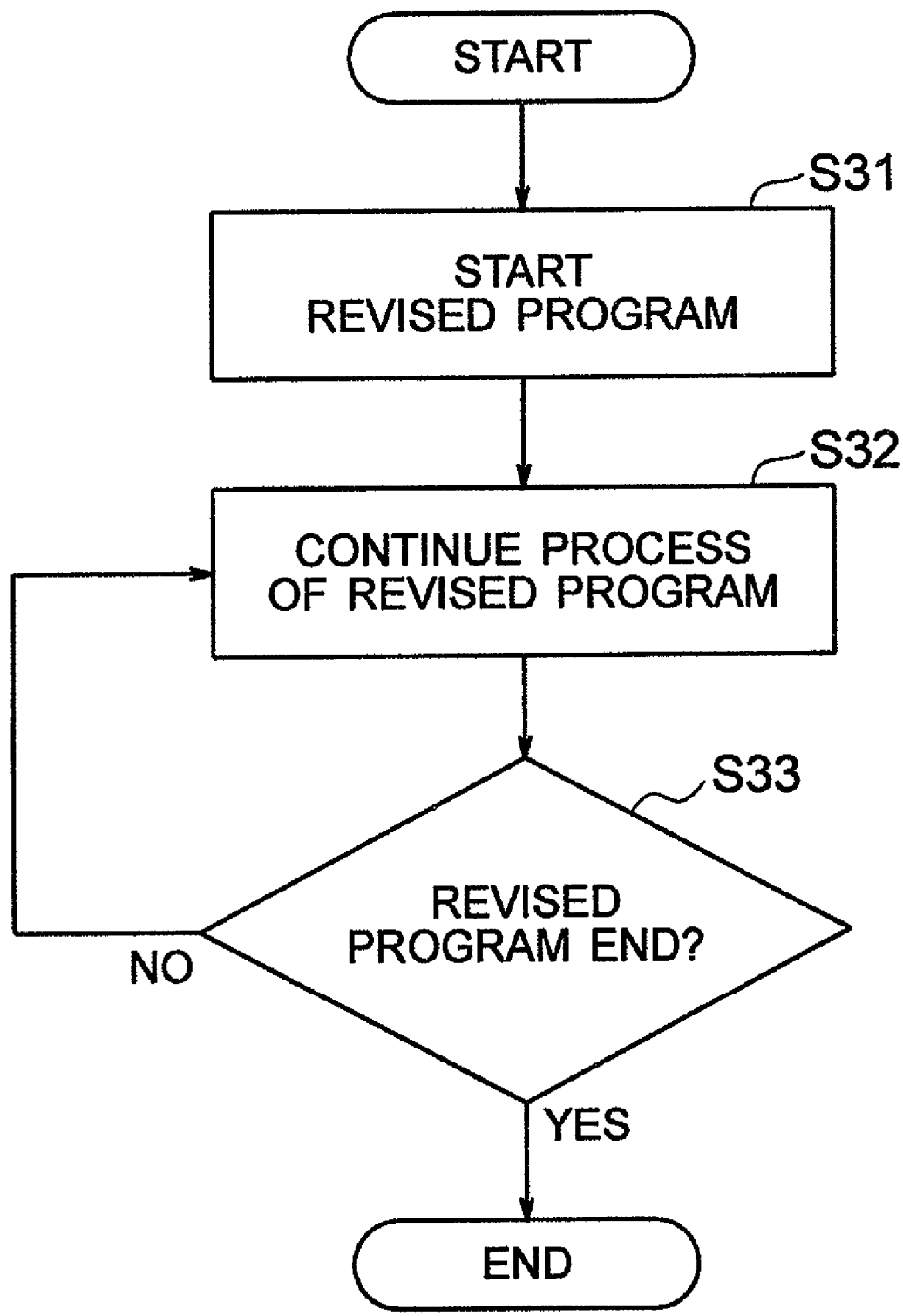
FIG. 10 is a flowchart of a revised program to be executed by an apparatus according to the embodiment of the present invention.

FIG. 10 is a flowchart of the revised program execution process executed by the apparatus 3 of the embodiment of the present invention.

Here, an explanation will be given on the case when executing the revised program A 333.

When an execution request of the revised program A 333 is received, the OS 331 of the apparatus 3 starts execution of the revised program.

Firstly, the OS 331 starts the revised program A 333 (S31). Next, the OS 331 continues the process of the started revised program A 333 (S32).

Next, the OS 331 judges whether the process of the revised program A 333 is completed (S33). If the process of the revised program A 333 is not completed, the OS 331 returns to step S32.

On the other hand, if the process of the revised program A 333 is completed, the OS 331 terminates execution of the revised program.

As has been described above, the apparatus 3 executes the revised program 333 and accordingly, need not include the program execution control unit 236. That is, program execution can be controlled only by that the apparatus 3 executes the revised program 333.

For this, in the computer system of the present embodiment, program execution can be controlled not depending on whether the apparatus 2 or 3 includes the program execution control unit 236. Accordingly, the managing server 1 can surely limit the program function for all the apparatuses 2 and 3.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A program distribution method carried out by a managing computer for distributing a corresponding program to an apparatus including a processor, a memory, and a communication interface, the method comprising:
storing program request information indicating a condition required for executing the program;

judging whether an apparatus as a distribution destination of the program includes a program execution control unit for controlling execution of the program;

partially revising the program to a partially revised program to be distributed, according to the program request information, when the program is to be distributed to an apparatus not including the program execution control unit; and distributing the partially revised program to the apparatus not including the program execution control unit;

the operation of partially revising the program includes adding a code for controlling a combination of a program to be simultaneously executed, to the program to be distributed.

2. The program distribution method as claimed in claim 1, further comprising:

distributing the program request information together with the program when the program is distributed to an apparatus including the program execution control unit.

3. The program distribution method as claimed in claim 1, wherein the operation of partially revising the program includes adding a code for controlling execution of the program according to a resource of the apparatus, to the program to be distributed.

4. The program distribution method as claimed in claim 1, wherein the operation of partially revising the program includes adding a code for stopping execution of the program if a predetermined condition is satisfied, to the program to be distributed.

5. A computer system comprising:

at least one apparatus including a processor, a memory, and an interface, and a managing computer for distributing a program to be processed by the at least one apparatus, wherein the managing computer includes:

a storage unit which stores program request information indicating a condition required for executing the program;

means which judges whether an apparatus as a distribution destination of the program includes a program execution control unit for controlling execution of the program;

means which partially revises a program to a partially revised program to be distributed to the apparatus, according to the program request information, when the program is to be distributed to an apparatus not including the program execution control unit; and distributing the partially revised program to the apparatus not including the program execution control unit;

wherein the apparatus executes the partially revised program revised by the managing computer; wherein the managing computer revises the program to be distributed, by adding a code for controlling a combination of programs to be simultaneously executed, to the program to be distributed.

6. The computer system as claimed in claim 5, wherein the managing computer also distributes the program request information together with the program when distributing the program to an apparatus including the program execution control unit.

7. The computer system as claimed in claim 5, wherein the managing computer revises the program to be distributed, by adding a code for controlling execution of a program according to a resource of the apparatus, to the program to be distributed.

8. The computer system as claimed in claim 5, wherein the managing computer revises the program to be distributed, by adding a code for stopping execution of a program if a predetermined condition is satisfied, to the program to be distributed.

9. A non-transitory computer-readable medium embodying a program effecting a program distribution method carried out by a managing computer for distributing a corresponding program to an apparatus including a processor, a memory, and a communication interface, the method effecting operations comprising:

storing program request information indicating a condition required for executing the program;

judging whether an apparatus as a distribution destination of the program includes a program execution control unit for controlling execution of the program;

partially revising the program to a partially revised program to be distributed, according to the program request information, when the program is to be distributed to an apparatus not including the program execution control unit; and distributing the partially revised program to the apparatus not including the program execution control unit; the operation of partially revising the program includes adding a code for controlling a combination of a program to be simultaneously executed, to the program to be distributed.

10. The non-transitory computer-readable medium as claimed in claim 9, wherein the method effecting further operations comprising:

distributing the program request information together with the program when the program is distributed to an apparatus including the program execution control unit.

11. The non-transitory computer-readable medium as claimed in claim 9, comprising:

the operation of partially revising the program includes adding a code for controlling execution of the program according to a resource of the apparatus, to the program to be distributed.

12. The non-transitory computer-readable medium as claimed in claim 9, comprising:

the operation of partially revising the program includes adding a code for stopping execution of the program if a predetermined condition is satisfied, to the program to be distributed.

* * * * *